April 8, 1924. 1,489,952
W. C. LAWSON
AGRICULTURAL IMPLEMENT
Filed July 3, 1919 3 Sheets-Sheet 1

Inventor,
William C. Lawson.
By
Attorney

April 8, 1924. 1,489,952
W. C. LAWSON
AGRICULTURAL IMPLEMENT
Filed July 3, 1919 3 Sheets-Sheet 2
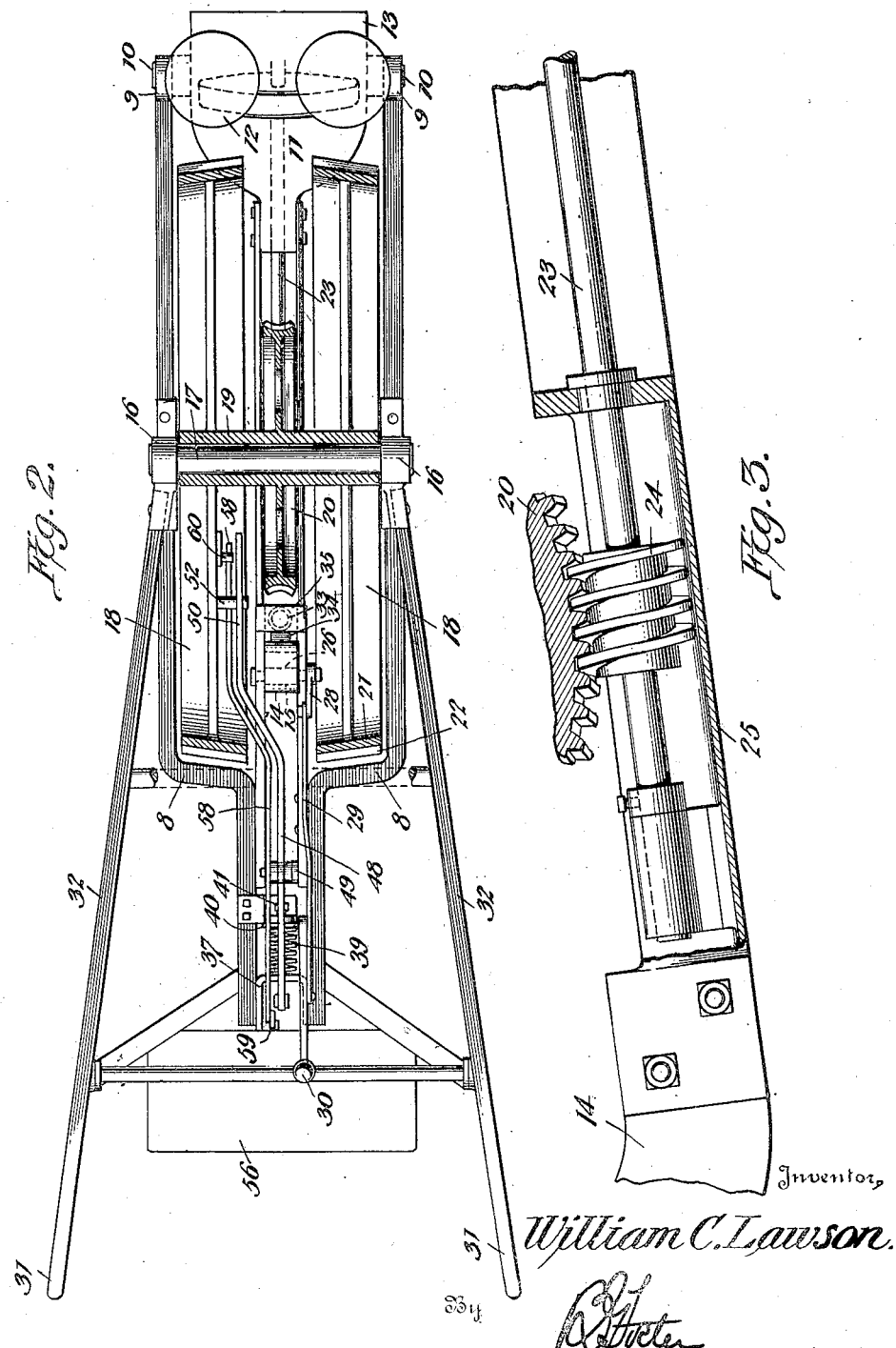
Inventor,
William C. Lawson.
By
Attorney April 8, 1924.
W. C. LAWSON
AGRICULTURAL IMPLEMENT
Filed July 3, 1919     3 Sheets-Sheet 3
1,489,952
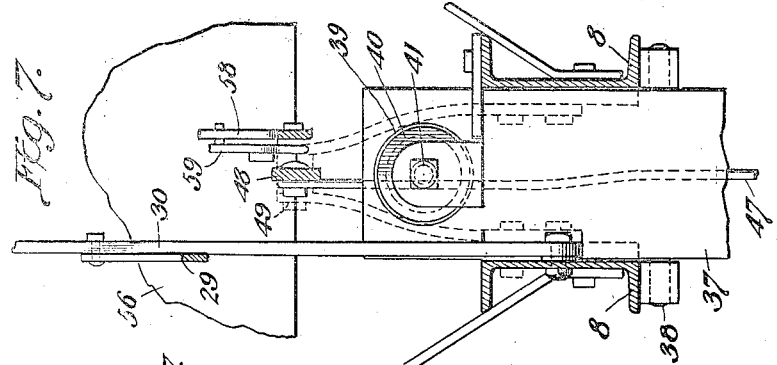
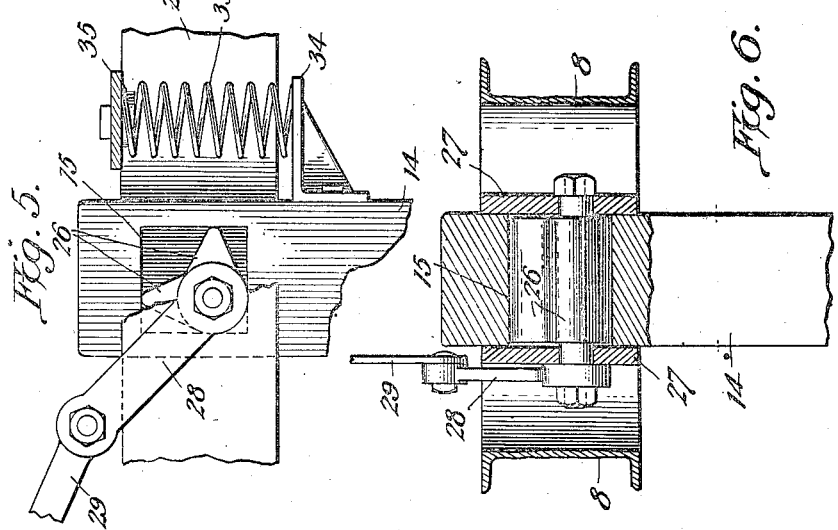
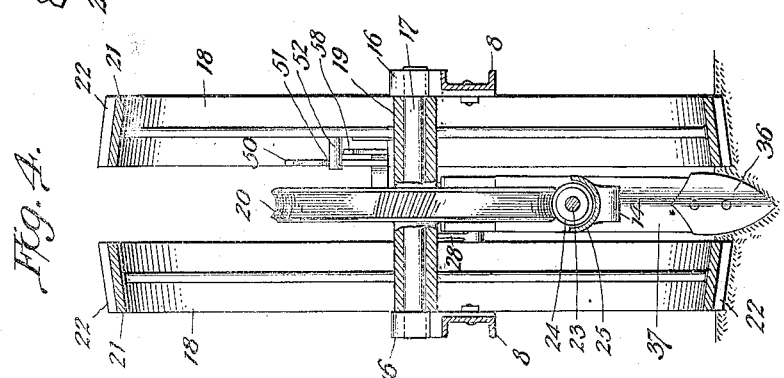
Inventor,
William C. Lawson.
By
Attorney Patented Apr. 8, 1924.

1,489,952

UNITED STATES PATENT OFFICE.

WILLIAM C. LAWSON, OF ROANOKE, VIRGINIA.

AGRICULTURAL IMPLEMENT.

Application filed July 3, 1919. Serial No. 308,390.

*To all whom it may concern:*

Be it known that I, WILLIAM C. LAWSON, a citizen of the United States, residing at Roanoke, in the county of Roanoke and State of Virginia, have invented certain new and useful Improvements in Agricultural Implements, of which the following is a specification.

The present invention relates more particularly to self-propelled implements and is especially designed for the type in which the operator walks and directs the machine.

One of the primary objects is to provide an exceedingly simple and practical machine of this type in which the motor can be coupled to and uncoupled from the tractor wheels with ease and expedition, the motor and the parts carrying the same being relatively low so that the center of gravity of the machine is correspondingly low, and the danger of tipping over thereby greatly lessened.

A further and important object is to provide tractor means that will at all times have a sufficient surface grip upon the earth, as for example, when operating on side hills or when tilted, as in turning.

A still further object is to provide plowing mechanism that will automatically uncouple the motor from the tractor wheels in case an extraordinary obstruction is encountered, thereby stopping the machine.

A still further object is to provide means that will automatically produce hills properly compacted and level, and in which fertilizer is thoroughly intermingled with the earth.

An embodiment of the invention that at present is considered the preferable one, is illustrated in the accompanying drawings, wherein:—

Figure 2 is a horizontal sectional view therethrough,

Figure 3 is a detail longitudinal sectional view through a portion of the motor frame.

Figure 4 is a cross sectional view on the line 4—4 of Figure 1.

Figure 5 is a detail view of the actuating means for the motor frame.

Figure 6 is a detail sectional view at right angles to Figure 5,

Figure 7 is a detail cross sectional view on the line 7—7 of Figure 1.

Similar reference numerals designate corresponding parts in all the figures of the drawings.

Figure 1:
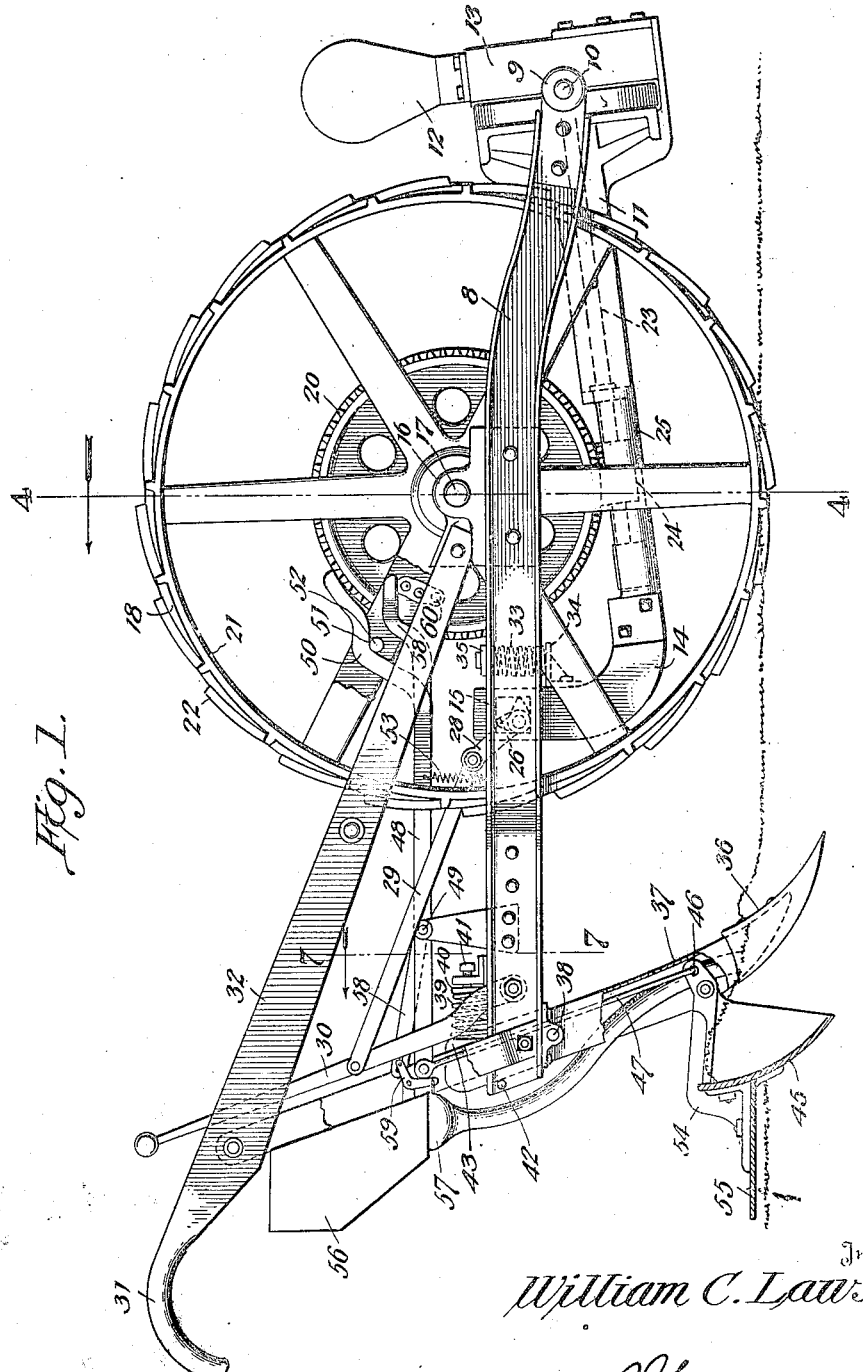
Figure 1 is a side elevation of the machine.

In the embodiment disclosed, a main frame is employed, comprising side bars 8 preferably of channel form, their front ends carrying journal boxes 9 in which are engaged the trunnions 10 of a motor frame 11. Said motor frame preferably consists of a substantially U-shaped beam having a motor 12 of any suitable character on its front end, the casing 13 of said motor being provided with the trunnions 10 and suitably connected to the beam 11. The rear end of the motor frame is in the form of a substantial elbow casting 14 having an angular opening 15 in its upper end.

The side bars 8 are provided with boxes 16 in which is fixed a shaft 17 that bridges the space between the bars, and has journaled thereon tractor wheels 18 carried by a sleeve 19 that has fixed thereto a worm gear 20 located between the wheels 18. It will be noted by reference to Figure 4 that the rims 21 of the wheels are outwardly tapered and are preferably provided with lugs 22. The motor has a shaft 23 journaled longitudinally in the beam 11, and said shaft is provided with a worm 24 adapted to mesh with the worm wheel 20. The portion of the beam 11 in which the worm 24 is located, constitutes a pocket 25 in which lubricant may be placed.

For the purpose of swinging the motor frame to cause the coacting engagement of the worm 24 and the worm wheel 20 and their disengagement, a double cam 26 is journaled in a pair of plates 27 fixed to the rear portions of the side bars 8 and projecting forwardly between said side bars. This double cam is engaged in the opening 15 and is provided at one end with a crank arm 28 having a link connection 29 and a hand lever 30. The lever 30 is fulcrumed on the rear end of the frame and extends upwardly adjacent to the grips 31 of the directing handles 32 that are suitably fixed to the frame. It will be obvious that by moving the lever 30 forwardly the double cams 26 will be moved downwardly, thereby depressing the motor frame sufficiently to disengage the worm 24 from the worm wheel 20, and when the lever is moved rearwardly the motor frame is moved upwardly to cause the worm to mesh with the worm wheel. In either position it will be evident that the engine frame is locked against accidental movement. To assist the downward movement of the cam, a coiled spring 33 may be interposed between a bracket 34 fixed to the casing 14 and an abutment plate 35 on the frame.

A plowing member 36 is provided that is carried by a U-beam 37 suitably pivoted, as illustrated for example at 38, to the rear end of the main frame. The rearward swinging movement of the plowing element is resisted by a relatively heavy coiled spring 39 that bears against the upper end of the beam 37, and is borne against by a plate 40 adjustably held by a set screw 41. The said set screw constitutes convenient means for varying the tension of the spring, and the forward swinging movement of the plowing element and beam is limited by a stop pin 42 against which the upper end of the beam normally rests. This beam furthermore has an outstanding lug or projection 43 that is adapted to strike the lever 30 when the plowing element 36 fails to move forwardly with the machine, as for example, when an obstruction is encountered, thereby serving to swing the lever 30 forwardly and cause the downward movement of the motor frame.

Pivotally mounted, as shown at 44 to the rear side of the beam 37 and adjacent to its lower end, is a hilling device in the form of a collecting scoop 45 that is disposed in rear of the plowing element 36 and has a forwardly extending ear 46 engaged by a link 47. This link has its upper end pivoted to a lever 48 suitably fulcrumed on the main frame, as shown at 49, said lever having an upturned front end 50 provided with an intermediate offset 51. One of the tractor wheels 18 is provided with a plurality of pins 52 adapted to engage the offset portion 51, as illustrated in Figure 1, so that as the wheel revolves the lever will be periodically actuated and temporarily held after each actuation. The return movement when released, is obtained by a coiled spring 53 engaged therewith and with the main frame. The collecting scoop 45 is provided with a rearwardly extending bracket 54 to which is secured a horizontal leveling and packing plate 55. A fertilizer holder 56 may also be fastened on the rear end of the machine and provided with a delivery spout 57, the lower end of which extends into the lower portion of the beam 37 and terminates just behind the plowing element and in advance of the collecting scoop. The delivery of the fertilizer from the holder 56 to the spout may be accomplished by any of the well known means, and said means is actuated by a lever 58. This lever is fulcrumed on the frame, and has a connection at its rear end, as shown at 59 with such actuating mechanism. The front end of the lever is in the path of movement of one or more pins 60 carried by one of the tractor wheels.

The operation of the apparatus is as follows. Assuming the motor, which is preferably an internal combustion engine, is in operation, if the lever 30 is swung rearwardly, the worm driven by the motor will be in mesh with the gear 20, and the tractor wheels thus rotated, propelling the machine forwardly. Because of the shape of the rims of said wheels not only will effective engagement take place when level ground is passed over, but if the machine is operating on a hillside, one of the rims will conform relatively to the slope of the ground, and therefore the rim of one wheel will be engaged substantially its entire width. This is also true if the machine is tilted to either side, as for example in turning.

As the machine progresses, if the plowing element 36 strikes an abnormal obstruction, it will stop, while the machine moves forwardly. This causes the upper end to strike the lever 30 and move it forwardly. Consequently with the assistance of the spring 33, the motor frame will be swung downwardly, disengaging the worm from the worm wheel and thus immediately stopping the machine. The same effect, of course, can be obtained by manually operating the lever 30.

During the progress of the machine, the normal position of the collecting scoop 45 is as shown in Figure 1, and as it follows the plowing element, it will accumulate a mass of earth. Intermingled with this earth is the fertilizer delivered to the spout 57. The lever 50 is, however, engaged periodically by the pins 52 and thereby swung, causing the scoop 45 to be elevated to discharge the collected earth. As soon as a pin 52 passes the lever, the spring 53 will act to return the scoop quickly to its operative position, and in doing so, the plate 55 will strike upon the pile, compacting and leveling it. In this way, hills are produced, the distance between the hills depending of course upon the number and spacing of the pins 52.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:

1. In apparatus of the character set forth, the combination with a main frame and a tractor wheel therefor, of a gear for the wheel, a motor frame movably mounted on the main frame and extending beneath the wheel gear, a motor on the motor frame having its center of gravity below the axis of the wheel, a driving gear on the motor frame operated by the motor and located beneath the gear, and means for moving the motor frame downwardly to disengage the gears and upwardly to engage the gears.

2. In apparatus of the character set forth, the combination with a main frame, of spaced tractor wheels journaled thereon, a gear wheel between the tractor wheels and fixed thereto, a motor frame pivoted to the main frame in advance of the wheels and below their axis of rotation, said motor frame extending between the wheels and below the gear wheel, a motor on the motor frame, a gear driven by the motor and meshing with the wheel gear, and means engaged with the rear end of the motor frame for moving it downwardly to disengage the gears and upwardly to engage the same.

3. In apparatus of the character set forth, the combination with a main frame and a tractor wheel therefor, of a gear for the tractor wheel, a motor frame pivotally mounted on the main frame and having a cam receiving opening in its free end, a motor on the motor frame, a gear on the motor frame driven by the motor and movable into and out of mesh with the wheel gear upon the movement of the motor frame, a cam journaled on the main frame and engaged in the opening of the motor frame, and means for moving the cam.

4. In apparatus of the character set forth, the combination with a main frame and a tractor wheel therefor, motor mechanism for transmitting power from the motor to the wheel, a plowing member movably mounted on and supported by the main frame, and means for automatically disengaging the motor from the tractor wheel upon a predetermined movement of the plowing member.

5. In apparatus of the character set forth, the combination with a main frame and a tractor wheel therefor, of a motor gearing connecting the motor and wheel and including separable members, a plowing member movably mounted on and supported by the main frame, and means for automatically separating the members of the gearing upon a predetermined movement of the plowing member.

6. In apparatus of the character set forth, the combination with a main frame and a tractor wheel therefor having a gear, of a motor frame pivotally mounted on the main frame, a motor mounted on the motor frame, a gear driven by the motor and movable into and out of mesh with the wheel gear upon the movement of the motor frame, means for effecting the movement of the motor frame, and a plowing member movably mounted on the main frame and adapted to actuate the means for effecting the movement of the motor frame.

7. In apparatus of the character set forth, the combination with a main frame, of a tractor wheel therefor having a gear, a motor frame pivoted on the main frame, a motor carried by the motor frame, a gear driven by the motor and movable into and out of mesh with the gear of the wheel upon the movement of the motor frame, means for moving the motor frame, a plowing member pivoted to the main frame, and means actuated by the plowing member for effecting the operation of the motor frame.

In testimony whereof, I affix my signature in the presence of a witness.

WILLIAM C. LAWSON.

Witness:
R. J. ANDERSON.